Nov. 8, 1938.   L. GOLDHAMMER   2,135,638
CINEMATOGRAPHIC APPARATUS
Filed March 17, 1934
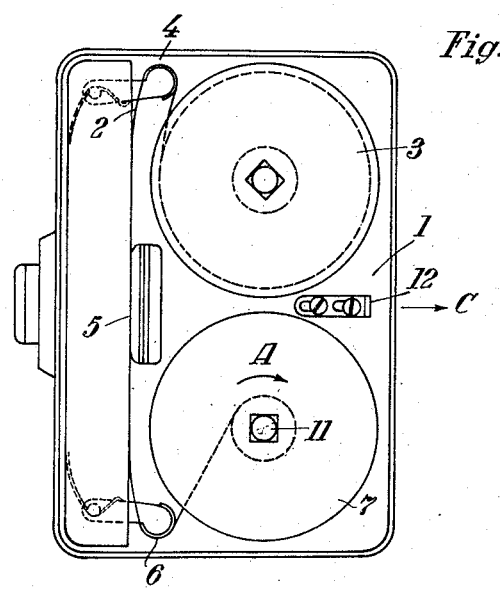
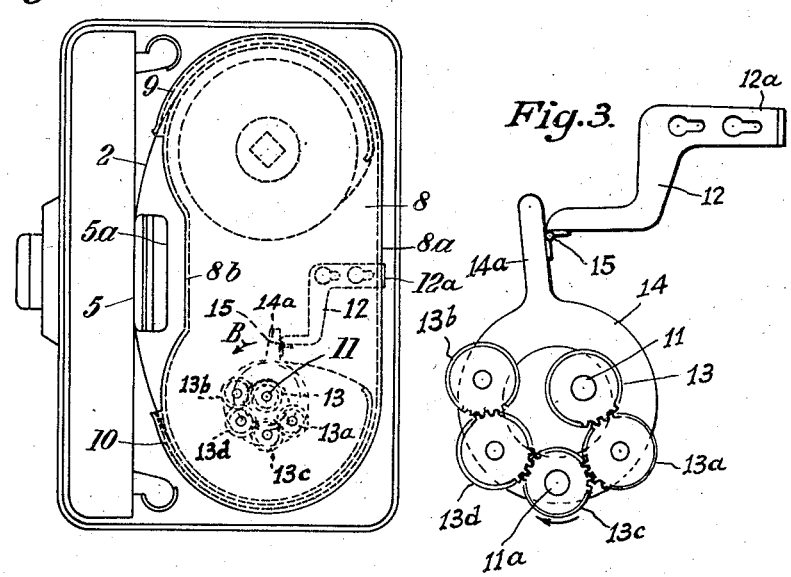
Inventor:
Leo Goldhammer,
by Philip J. Hopkins,
Attorney.

Patented Nov. 8, 1938

2,135,638

UNITED STATES PATENT OFFICE 2,135,638

CINEMATOGRAPHIC APPARATUS

Leo Goldhammer, Munich, Germany, assignor to Agfa Ansco Corporation, Binghamton, N. Y., a corporation of New York Application March 17, 1934, Serial No. 716,162
In Germany March 21, 1933

3 Claims. (Cl. 88—17)

My present invention relates to cinematographic apparatus and has for its objects a cinematographic apparatus which is selectively adapted for use with films wound on spools or contained in a magazine. Further objects will be seen from the detailed specification following hereafter.

When using a very light-sensitive material for taking pictures, the magazine has proved a more reliable holder for the photographic material than a spool, particularly if the spool must be inserted in full daylight. For another reason, too, it is desirable that besides spools also magazines may be utilized in cinematographic apparatus. Though the spool is the cheaper means for holding and guiding film, the magazine owing to its readiness for exposure, is considerably more favorable than the spool, particularly when guiding the film without formation of a loop. Exchanging a magazine requires only a fraction of the time required for loading a spool.

This invention relates to an apparatus in which either, spools or magazines can be used according to the requirements of the customer. When selectively using spools and magazines in one and the same apparatus, however, care must be had that the emulsion layer always faces the objective, since exposure through the backing of the film is impossible owing to the dark colored antihalation layer. In magazines the emulsion layer generally forms the outer layer and in spools it forms the inner side of the film. Therefore, when using spools the film must be guided through the apparatus in another way and wound in another direction than with the use of a magazine.

Therefore, according to this invention a reverse gear is mounted between the driving mechanism of the cinematographic apparatus and the take-up spool, by which gear the direction of revolution of the take-up spool may be changed. The change of one direction of revolution preferably takes place upon the insertion of a magazine into the apparatus. This may be achieved by a stop hinged to the arm carrying the change direction wheels and moved by the insertion of the magazine in the apparatus so as to couple wheels which were idling with the driving axle of the take-up core.

The object of the invention is hereafter more fully described with reference to the accompanying drawing in which Fig. 1 is a lateral view of a cinematographic apparatus loaded with film spools, the lid being removed, Fig. 2 is a lateral view of a cinematographic apparatus loaded with a magazine, the lid being likewise removed, Fig. 3 is a detail view of the reverse gear drive.

When loading the cinematographic apparatus 1 with film spools (Fig. 1), the film 2 passes from the supply spool 3 over the film guiding means 4 to the gate 5 and then over the elastic film guiding means 6 to the take-up spool 7 which with the take-up shaft 11 turns in direction of the arrow A in a manner hereafter explained. When a magazine 8 is placed in the apparatus (Fig. 2), the film 2 leaves the magazine through a slit 9 and passes directly to the gate 5 and then to the slit 10 through which it again enters the magazine where it is wound upon a suitable core having usual driving connections with the take-up shaft 11. The take-up shaft 11 and film core turns, and in this case in a direction opposite to that of the spool 7 (see Fig. 2, arrow B).

The means for reversing the direction of rotation of the take-up shaft 11 comprises a gear 13 on the shaft 11 with which there is adapted to selectively engage either one of two gears 13a and 13b rotatably mounted upon a pivoted support 14. The gear 13a meshes at all times with a fixed gear 13c which forms part of the driving mechanism (not shown) of the cinematographic apparatus. This fixed driving gear always rotates in the direction of the arrow in Figure 3. The support 14 is pivoted to swing upon the center line of the drive shaft 11a of the fixed gear 13c.

Also rotatably mounted upon the support 14 is the gear 13d meshing at all times with the fixed driving gear 13c and with the gear 13b.

Obviously when the support 14 is pivoted to the left, as shown in Figure 3, the gear 13a will be moved into engagement with the gear 13 whereby to drive the shaft 11 and the film spool 7 to the right (see Fig. 1), as is necessary when spools are in the apparatus. When the support 14 is pivoted to the right, the gear 13a disengages the gear 13, and the gear 13b engages the gear 13 whereby the drive shaft 11 and the film core of the magazine are rotated to the left as indicated by the arrow B in Fig. 2, and which is the direction of rotation normal when a magazine is used.

The pivoting of the support 14 is accomplished by means of an arm 14a projecting therefrom and to which is hinged, as at 15, one end of an angular slide 12 suitably mounted to slide on the apparatus, and the opposite end 12a of which is turned up as a stop in position to be engaged by the back wall 8a of the magazine. Thus when spools are used in the apparatus, the slide 12 is moved to the left as in Figure 3. This results in rotating the drive shaft 11 and take-up spool 7 to the right, as is required. When a magazine is used in the apparatus, it is placed therein in such a manner that the back wall 8a engages the stop 12a and moves the slide 12 to the right, this resulting in causing the drive shaft 11 and film core of the magazine to rotate to the left, as is required. In its middle part 8b on the side near the objective the magazine 8 is recessed to such an extent that the pressure plate 5a may be withdrawn without removing the magazine.

What I claim is:

1. A cinematographic camera for use selectively with spools and magazines comprising a casing, a film gate, a film supply shaft and a film take-up shaft, means in said casing for changing the direction of rotation of said take-up shaft, a manually operable member for actuating said changing means and a stop on said member engageable by a magazine upon insertion in the casing for moving said member in one direction whereby said take-up shaft will rotate in a direction normal to a magazine.

2. A cinematographic camera for use selectively with spools and magazines comprising a casing, a film gate, a film supply shaft and a film take-up shaft, reverse gear means in said casing for changing the direction of rotation of said take-up shaft, means comprising a slidable member mounted in said casing having operative connections with said reverse gear means and a stop on said slidable member moved by the insertion of a magazine in the camera for moving said slide in one direction for actuating said reverse gear means.

3. A cinematographic camera for use selectively with spools and magazines comprising a casing, a film gate, a film supply shaft and a driven film take-up shaft, reverse gear means in said casing for reversing the drive to said film take-up shaft to change the direction of rotation thereof, movable means mounted in said casing having operative connection with said reverse gear means, said movable means including a part moved by the insertion of a magazine into the camera for actuating said reverse gear means.

LEO GOLDHAMMER.